Patented Aug. 29, 1933

1,924,444

UNITED STATES PATENT OFFICE 1,924,444

VAT DYESTUFF AND METHOD FOR ITS PRODUCTION

Max Albert Kunz, Mannheim, and Karl Koeberle and Erich Berthold, Ludwigshafen-on-the-Rhine, Germany, assignors to General Aniline Works, Inc., New York, N. Y., a corporation of Delaware No Drawing. Application March 14, 1929
Serial No. 347,168

3 Claims. (Cl. 260—61)

The present invention relates to new vat dyestuffs and a method for their production.

We have found that valuable vat dyestuffs dyeing the vegetable fibre valuable brown shades of excellent fastness are obtained when condensing a mono- or dihalogen-3.4.8.9-dibenzopyrene-5.10-quinone with an 1-aminoanthraquinone containing in the 2-position a substituent capable of being converted into an aldehyde group, and converting said substituent into the aldehyde group. A substituent of the said kind is for example the methyl group which can be converted into the aldehyde group very readily by oxidation. Such oxidation may even occur, and is preferably effected, during the condensation with the halogen-dibenzopyrene-quinone, for example when working under oxidizing conditions, such as working in nitrobenzene in the presence of copper oxide and introducing oxygen or gases containing oxygen. Another example of such substituents is the azomethine group —CH=N—R, or the dihalogen-methyl group —CH Hal₂, which groups can be split up to the aldehyde group by treatment with acids such as sulphuric acid. The dyestuffs obtainable according to the present invention correspond to the general formula

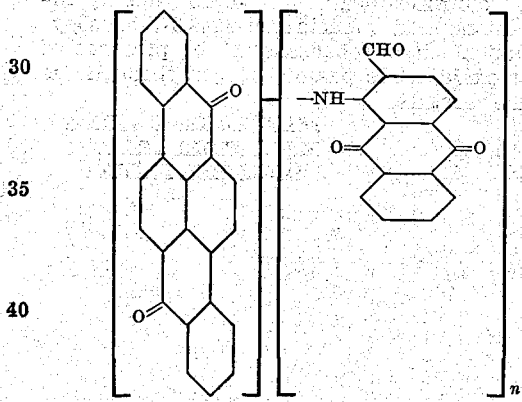

wherein n is 1 or 2.

The same dyestuffs are also obtained by condensing 1 molecular proportion of a mono- or dihalogen -3.4.8.9 - dibenzopyrene - 5.10 - quinone with from 1 to 2 molecular proportions of 1-amino-2-anthraquinone-aldehyde, but we do not claim this method as part of our invention.

The said condensation products, insofar as they are derived from a monohalogen-dibenzopyrene-quinone, give brown dyeings of excellent fastness from violet vats. They dissolve to red solutions with a bluish tinge in concentrated sulphuric acid.

The following examples will further illustrate the nature of our present invention which, however, is not limited thereto. The parts are by weight.

Example 1

41 parts of monobromo-3.4.8.9-dibenzopyrene-5.10-quinone are boiled in 800 parts of nitrobenzene, while stirring, with 25 parts of 1-amino-2-anthraquinone-aldehyde, 25 parts of sodium acetate and 4 parts of copper oxide, until the reaction product is free from bromine. The product may be worked up by filtering by suction and treating the residue with steam in order to remove the last traces of solvent, or by distilling off the solvent, if desired with the aid of a vacuum or of steam or both. The resulting dyestuff probably corresponding to the formula:

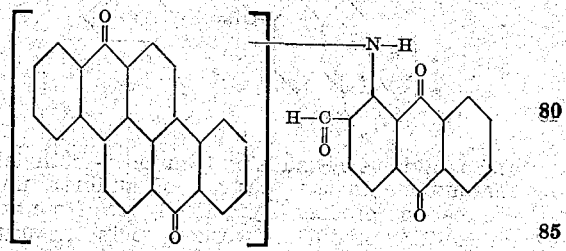

is a brown powder dissolving to a bluish red solution in concentrated sulphuric acid and dyeing the vegetable fibre from a violet vat fast brown shades.

Instead of nitrobenzene, other solvents or suspension media, for example naphthalene, may be used.

Example 2

41 parts of monobromo-3.4.8.9-dibenzopyrene-5.10-quinone are boiled in 400 parts of nitrotoluene, while stirring and passing through a current of oxygen, with 30 parts of 1-amino-2-methylanthraquinone, 50 parts of calcined potassium carbonate and 10 parts of copper oxide, until the reaction product is practically free from bromine. The product is worked up as indicated in Example 1. It may be purified by treatment with sodium hypochlorite and is identical with the product described in Example 1.

Example 3

49 parts of dibromo-3.4.8.9-dibenzopyrene-5.10-quinone are boiled in 1500 parts of nitrobenzene, while stirring and introducing a current of air or oxygen, with 150 parts of potassium carbonate, 20 parts of copper oxide and 55 parts of 1-amino-2-methylanthraquinone, until the reaction product is practically free from bromine. The product probably corresponding to the formula:

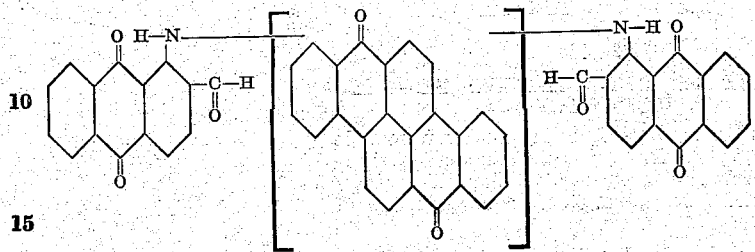

is worked up in the usual manner and may be purified for example by treatment, in paste form, with an alkaline hypochlorite solution. It dissolves to a blue-red solution in concentrated sulphuric acid and dyes cotton from a violet blue vat red-brown shades of excellent fastness.

The same dyestuff can be prepared by condensation of 1 molecular proportion of the above dibromo-dibenzopyrene-quinone with 2 molecular proportions of 1-amino-2-anthraquinone-aldehyde.

*Example 4*

49 parts of the above dibromo-3.4.8.9-dibenzopyrene-5.10-quinone are boiled in 1200 parts of nitrobenzene, while stirring, with 50 parts of sodium acetate, 5 parts of copper oxide and 80 parts of the azomethine which is the condensation product of 1-amino-2-anthraquinone-aldehyde and aniline (corresponding to the formula

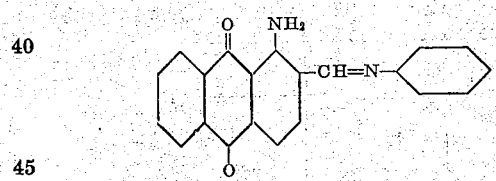

and obtainable by oxidizing 1-amino-2-methylanthraquinone in the presence of aniline), until the reaction product is practically free from bromine. The product is worked up in the usual manner, dissolved in concentrated sulphuric acid and precipitated therefrom by dilution. Thereby the dyestuff which is identical with that described in Example 3, is obtained in paste form.

In an analogous manner the dyestuff described in Example 1 can be obtained from monobromo-3.4.8.9-dibenzopyrene-5.10-quinone and the above azomethine.

What we claim is:—

1. The vat dyestuffs probably corresponding to the formula

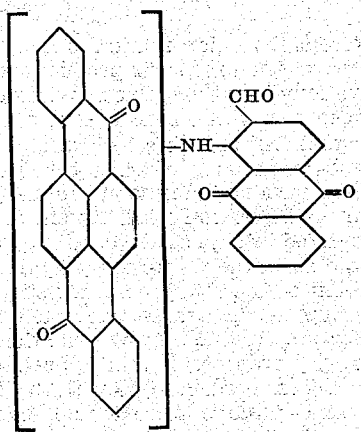

dyeing cotton from a violet vat brown shades of excellent fastness and dissolving to a red solution with a bluish tinge in concentrated sulphuric acid.

2. The process of producing vat dyestuffs, which comprises heating a 1-amino-2-methylanthraquinone and a monobromo-3.4.8.9-dibenzopyrenequinone in an organic solvent in the presence of a gas comprising oxygen.

3. The process of producing vat dyestuffs, which comprises heating 1-amino-2-methylanthraquinone and monobromo-3.4.8.9-dibenzopyrenequinone in nitrobenzene in the presence of copper oxide, while passing oxygen through the reaction mixture.

MAX ALBERT KUNZ.
KARL KOEBERLE.
ERICH BERTHOLD.